INVENTOR
JEAN AUGUST TRABUT

ATTORNEY

United States Patent Office 2,858,455
Patented Oct. 28, 1958

2,858,455

ELECTRIC CIRCUIT COMPRISING OF A TRANSFORMER AND A SERIES CONDENSER IN ONE OF THE WINDINGS

Jean Auguste Trabut, Chambery, France, assignor to Compagnie Generale d'Electricite, Paris, France, a corporation of France Application February 17, 1954, Serial No. 410,777

Claims priority, application France February 20, 1953

6 Claims. (Cl. 307—58)

The present invention relates to electric circuits consisting of a transformer and a condenser in series with one of the windings of the transformer, particularly intended for line voltage stabilization, which is provided with an auixilary device effectively counteracting the effects of ferro-resonance of such line voltage stabilization circuits.

It is known that the ferro-magnetic circuits of such electric voltage stabilization circuits are the cause of phenomena known as "ferro-resonance" the result of which is that they function not only under normal stable conditions, known as low-current conditions, but also under other stable conditions known as high-current conditions, the point of transition between these two conditions occurring at "swing-over" or "change-over" when the ferro-magnetic element reaches saturation.

These circuits function normally at low current conditions but the appearance of a transient, for example, of an overvoltage or surtension which may be caused by the action of a switch, is sufficient to abruptly change over from a condition of low current to one of high current which condition of high current can then subsist indefinitely as long as the circuit does not undergo any large changes.

As a result of this phenomenon, which will be referred hereinafter as "swing-over" and which takes place at ferro-resonance, the condenser becomes the place of an overvoltage or surtension, which can be very high and which assumes its full amplitude immediately after the swing-over to remain there subsequently.

An attempt to counteract this phenomenon in the prior art consisted in connecting across the condenser a resistance thereby absorbing a sufficient power. This resistance prevents a "swing-over." However, it cannot be left permanently connected in the circuit because of its continued high power consumption.

In order to decrease the current flowing through the resistance, thus connected across the condenser, it was also proposed that an iron core inductance reaching saturation when "swing-over" took place be connected in series with the resistance. This arrangement, while resulting in a definite improvement, exhibits two drawbacks, namely (1) Under normal operating conditions, losses in the resistance are not negligible, and (2) The presence of an inductance in series with the resistance renders the latter less efficient when "swing-over" takes place.

Accordingly, it is an object of the present invention to provide a circuit arrangement which obviates the aforementioned drawbacks and which provides efficient damping of the line voltage stabilization circuits to effectively counteract the tendency of swing-over which is combined with a very reduced active power consumption under normal working conditions.

It is a further object of the present invention to provide an auxiliary arrangement for line voltage stabilization circuits with a transformer and a condenser which minimizes the power consumption during normal operation and which effectively prevents "swing-over" at ferro-resonance.

A still further object of the present invention resides in the provision of an auxiliary transformer connected in a line voltage stabilization circuit in such a manner as to offer substantially zero ampere-turns under normal operating conditions.

Another object of this invention is an electrical circuit consisting of a main transformer and series condenser connected in one of the windings thereof, a particular feature of the circuit being an additional anti-swing-over auxiliary transformer having a primary and a secondary winding connected in series with the primary and secondary winding of the main transformer respectively, the primary or secondary winding of the auxiliary transformer being coupled with a load device capable of absorbing a real power sufficiently large to prevent the possibility of swing-over in the circuit through ferro-resonance, which is achieved by calculating and selecting the auxiliary transformer windings in such a manner that the resulting ampere-turns are approximately zero when the main transformer magnetizing current is proportional to the line voltage.

Further objects, features and advantages of the present invention will become more obvious from the following description when taken in connection with the accompanying drawing which shows, for purposes of illustration only, two embodiments in accordance with the present invention, and wherein Figure 1 is an electrical circuit diagram of one embodiment in accordance with the present invention, intended for voltage stabilization, Figure 2 is an electrical circuit diagram of a second modified embodiment in accordance with the present invention, Figure 3 is an electrical circuit diagram of a third modified embodiment in accordance with the present invention, and Figure 4 is an electrical circuit diagram of a fourth modified embodiment in accordance with the present invention.

Referring now to the drawing wherein like reference characters are used throughout the various views thereof to designate like elements, and more particularly to Figure 1, reference character C designates a condenser connected in series with the secondary winding $N_2$ of a main transformer T which also comprises a primary winding $N_1$ in series with a line through which a current I flows. Normally the condenser C functions to stabilize the voltage of the line to ensure proper operation. The secondary winding $N_2$ of the main transformer T supplies condenser C connected in series in the secondary winding $N_2$ with electric energy.

In accordance with the present invention, an auxiliary transformer S is connected in series with the main transformer T, i. e., the primary winding M of the auxiliary transformer S is connected in series with the primary winding $N_1$ of the main transformer T and the line conductor through which a current I flows. On the other hand, the secondary winding $M_2$ of the auxiliary transformer S is connected in series with the series circuit consisting of the secondary winding $N_2$ of the main transformer T and condenser C.

A resistance R is additionally connected across secondary winding $M_2$ of the auxiliary transformer S to absorb the power developed across the terminals of the secondary winding $M_2$.

The transformer ratio of the auxiliary transformer is calculated so that for normal operating conditions, the net resulting ampere-turns are approximately zero, as will be explained more fully hereinafter. Under these conditions, the total voltage developed across the auxiliary transformer S is very small, and consequently resistance R absorbs only a negligible amount of power. The voltage across the auxiliary transformer S remains small under all loads as long as the main transformer T is not saturated, i. e., as long as the magnetizing current remains approximately proportional to the energizing voltage.

Swing-over as a result of ferro-resonance from small-current conditions to high conditions can be expected when the main transformer T becomes saturated. Its magnetizing current then increases more rapidly than its line voltage and the primary and secondary currents thereof are no longer proportional to each other so that the effective ampere-turns of the primary and secondary windings of the auxiliary transformer S are no longer equal. A high voltage appears across the terminals of the secondary winding of the auxiliary transformer S and resistance R absorbs a real power sufficiently large to avoid the risks of "swing-over."

If:

$n_1$ and $n_2$ are the numbers of primary and secondary turns of the main transformer T respectively,
$m_1$ and $m_2$ the numbers of primary and secondary turns of the auxiliary transformer S respectively,
I the current through the line conductor,
$I_c$ the current through the condenser, and
$I_0$ the magnetizing current of the main transformer T which is read as primary, then the relation between the various currents may be expressed as follows:

$$I = I_c \frac{n_2}{n_1} = I_0$$

As long as the main transformer T does not reach saturation, it can be assumed that its magnetizing current $I_0$ is proportional to the applied voltage and, therefore, also to current $I_0$ in the secondary winding thereof which flows through the condenser C. The above equation may then be expressed as follows:

$$I_0 = kI_c \quad (1)$$

where $k$ is a constant, and $$I = I_c \left( \frac{n_2}{n_1} + k \right)$$

As indicated earlier, the windings of the auxiliary transformer S are calculated so that, under normal operating conditions, the ampere-turns of the auxiliary transformer S cancel each other out. Consequently the relationship of the currents I and $I_c$ may be expressed as follows:

$$m_1 I = m_2 I_c$$

Substituting this relationship into Equation 2, it follows:

$$m_1 I_c \left( \frac{n_2}{n_1} + k \right) = m_2 I_c$$

which may be rewritten as $$\frac{m_2}{m_1} = \frac{n_2}{n_1} + k \quad (3)$$

It is obvious from the foregoing that the voltage ratio of the auxiliary transformer S must be equal to the turn ratio $$\frac{n_2}{n_1}$$

of the main transformer T to which is added to the ratio $$k = \frac{I_0}{I_c}$$

between the magnetizing current of the main transformer T and the current in condenser C before the transformer reaches saturation.

Current $I_0$ and current $I_c$ flow in opposite direction by suitably selecting the respective directions of the transformer windings and the ratio $k$ is negative. Consequently, the ratio $$\frac{m_2}{m_1}$$

must be smaller than $$\frac{n_2}{n_1}$$

by an amount equal to $k$.

When the magnetic circuit of the main transformer T reaches saturation, Equation 1 no longer obtains. At the time when "swing-over" caused by ferro-resonance of the circuit normally takes place, the magnetizing current of the transformer becomes:

$$I'_0 = kI_c + J$$

and line current may be expressed as follows:

$$I = I_c \frac{n_2}{n_1} + kI_c + J$$

The resulting ampere turns of $m_1 I - m_2 I_c$ in the auxiliary transformer S are no longer equal to zero, and the relationship may be expressed as follows:

$$m_1 I - m_2 I_c = m_1 \left( \frac{n_2}{n_1} + k \right) I_c + m_1 J - m_2 I_c$$

which may be rewritten by taking into account Equation 3:

$$m_1 I - m_2 I_c = m_1 J$$

The ampere-turns $m_1 J$ cause a voltage across the terminals of the auxiliary transformer S causing in turn a real power consumption which is sufficient to prevent all possibilities of "swing-over."

In the embodiment illustrated in Figure 1, the energy developed across auxiliary transformer S is consumed in resistance R across the secondary winding $M_2$ of the transformer S. It will be readily understood, however, that the resistance can be connected either across the secondary winding or across the primary winding, across the entire winding thereof or across only a part of the winding. The ampere-turns $m_1 J$ can also be the cause of power consumption in a third short-circuited winding having a predetermined resistance. Lastly, the power can also be absorbed directly by the magnetic-circuit losses in the auxiliary transformer S itself whereby the auxiliary transformer S is made up of solid iron cores instead of laminations.

The main transformer T and the auxiliary transformer S may be constructed as auto-transformers, as shown in the embodiment of the present invention according to Figure 2.

Again, the main transformer is designated with "T", the auxiliary transformer by "S" and the load by "R" which is connected across a portion of the auxiliary transformer S.

A condenser C is interconnected in a series circuit including the transformers T and S, while the input line is connected with a tab of the main transformer T and the output line with a tab of the auxiliary transformer S.

Figure 1:
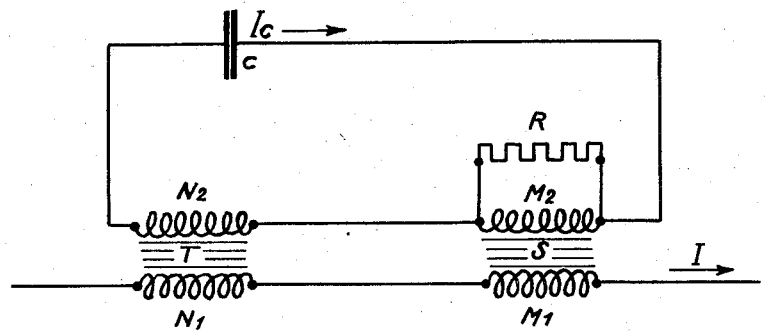
Figure 2:
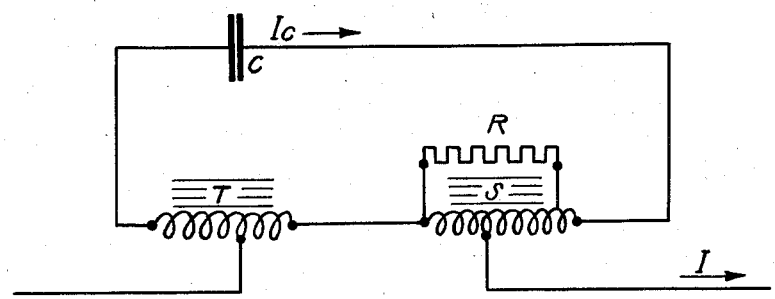
Figure 3:
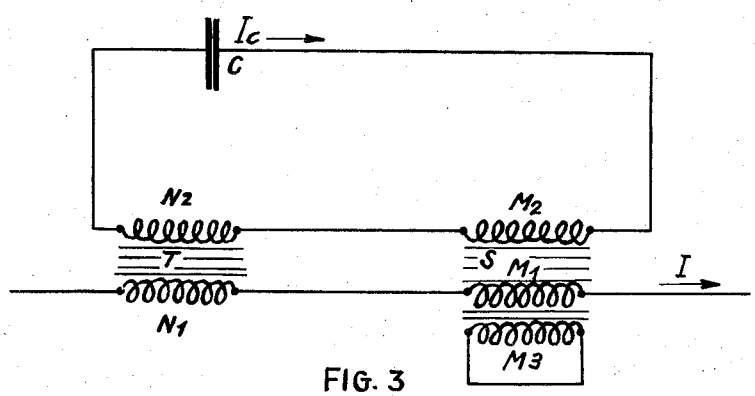
Figure 3 illustrates an embodiment similar to Figure 1 in which the load is formed by a tertiary winding $M_3$ which is resistive in nature and is short-circuited.
Figure 4:
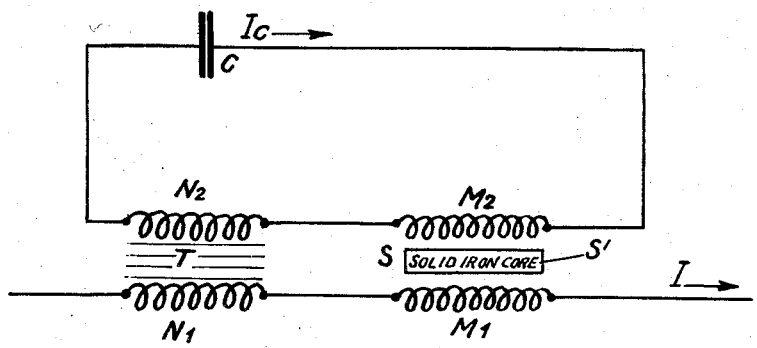
Figure 4 is still another embodiment similar to Figure 1 in which a solid iron core S' is used in connection with the transformer S which forms the load.

It can be easily demonstrated mathemathically that a similar relationship may be obtained in connection with the embodiment according to Figure 2 as is obtained with that of Figure 1 whereby the total resultant ampere-turns are approximately zero during normal operating conditions when the magnetizing of the transformer is proportional to the applied voltage.

What I claim as new and desire to secure by Letters Patent of the United States is:

1. An electrical circuit for compensating the distributed inductance of a line comprising an electrical line, a first transformer with a magnetic iron core circuit, said first transformer comprising a primary winding connected in series in said electrical line and a secondary winding, a condenser connected with the secondary winding of said first transformer, a second transformer comprising a magnetic iron core circuit and including a primary winding and a secondary winding, the primary winding of said second transformer being connected in series with the primary winding of said first transformer and the secondary winding of said second transformer being connected in series with said secondary winding of said first transformer, and load means coupled to said second transformer for absorbing a sufficient real power to avoid the dangers of swing-over from one condition to another caused by ferro-resonance of said ferro-magnetic circuits, the two windings of said second transformer effectively providing resulting ampere-turns essentially equal to zero while the magnetizing current of said first transformer is substantially proportional to the applied voltage thereof.

2. An arrangement according to claim 1, wherein said load means is an electrical resistance connected in parallel with one of the windings of said second transformer.

3. Arrangement according to claim 1, wherein said load means is formed by a tertiary winding of said second transformer, said tertiary winding being resistive in nature and being short-circuited.

4. Arrangement according to claim 1, wherein the magnetic circuit of said second transformer comprises a solid iron core forming said load means.

5. Arrangement according to claim 1, wherein said transformers are auto transformers each having a winding of which a portion thereof forms simultaneously part of the primary winding and part of the secondary winding thereof.

6. In a line voltage stabilization circuit for compensating for the distributed inductance of a line a first transformer having input means and output means determined by the transformation ratio thereof, a second transformer having input means and output means determined by the transformation ratio thereof, a series circuit including a condenser and one of said means of each of said first and second transformers, both said transformers having metallic saturable magnetic circuits, means for connecting said transformers with each other to provide essentially zero resultant ampere-turns in said second transformer with said first transformer operating below saturation of the magnetic circuit thereof, and load means connected across said second transformer to dissipate the energy developed thereacross.

References Cited in the file of this patent
UNITED STATES PATENTS

| | | |
|---|---|---|
| 1,985,634 | Fleming | Dec. 25, 1934 |
| 2,221,456 | Pohm et al. | Nov. 12, 1940 |